United States Patent
Calaway et al.

(10) Patent No.: US 9,147,428 B1
(45) Date of Patent: Sep. 29, 2015

(54) DISK DRIVE WITH IMPROVED SPIN-UP CONTROL

(71) Applicant: Western Digital Technologies, Inc., Irvine, CA (US)

(72) Inventors: Charles J. Calaway, Tustin, CA (US); Wenli Yang, Oak Park, CA (US); Ashok K. Desai, Westlake Village, CA (US); Jinsik Kim, Irvine, CA (US); Jianghong Ding, Ladera Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/480,566

(22) Filed: Sep. 8, 2014

Related U.S. Application Data

(62) Division of application No. 13/869,885, filed on Apr. 24, 2013.

(51) Int. Cl.
*G11B 15/46* (2006.01)
*G11B 19/20* (2006.01)
*G11B 19/28* (2006.01)

(52) U.S. Cl.
CPC ............ *G11B 19/2054* (2013.01); *G11B 19/28* (2013.01)

(58) Field of Classification Search
None
See application file for complete search history.

(56) References Cited

U.S. PATENT DOCUMENTS

| | | | |
|---|---|---|---|
| 5,170,386 A | 12/1992 | Tateishi |
| 5,432,766 A | 7/1995 | Ando et al. |
| 5,473,230 A | 12/1995 | Dunn et al. |
| 5,650,886 A | 7/1997 | Codilian et al. |
| 5,682,334 A | 10/1997 | Plutowski et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,158 A | 6/2000 | Heeren et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |

(Continued)

OTHER PUBLICATIONS

José Carlos Gamazo-Real, et al., "Position and Speed Control of Brushless DC Motors Using Sensorless Techniques and Application Trends", Sensors 2010, pp. 6901-6947.

*Primary Examiner* — Andrew L Sniezek

(57) ABSTRACT

A disk drive is disclosed comprising a head actuated over a disk, and a spindle motor operable to rotate the disk. The disk drive comprises control circuitry configured to a rotation speed of the spindle motor, generate a gain as a function of the measured rotation speed, wherein the function comprises a polynomial having a degree greater than one, and spin-up the spindle motor based on the gain.

9 Claims, 13 Drawing Sheets

(56) References Cited

U.S. PATENT DOCUMENTS

| | | |
|---|---|---|
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,088 B2 | 6/2003 | Heydt et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,825,622 B1 | 11/2004 | Ryan et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,953 B1 | 1/2006 | Codilian |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,328 B2 | 1/2007 | Fayeulle |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,197,410 B2 | 3/2007 | Heydt et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,378,810 B1 | 5/2008 | Sutardja et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,443,628 B2 | 10/2008 | Oyabu |
| 7,450,334 B1 | 11/2008 | Wang et al. |

(56) References Cited

U.S. PATENT DOCUMENTS

| | | |
|---|---|---|
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,499,239 B2 | 3/2009 | Chang |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,129 B2 | 10/2009 | Shirai et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,217,615 B2 | 7/2012 | Tan et al. |
| 8,254,222 B1 | 8/2012 | Tang |
| 8,258,729 B1 | 9/2012 | Ito et al. |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |

(56) References Cited

U.S. PATENT DOCUMENTS

| | | |
|---|---|---|
| 8,804,267 B2 | 8/2014 | Huang et al. |
| 8,824,081 B1 | 9/2014 | Guo et al. |
| 8,824,262 B1 | 9/2014 | Liu et al. |
| 2003/0007278 A1* | 1/2003 | Ang et al. ............... 360/73.03 |
| 2005/0099148 A1* | 5/2005 | DuLaney ............... 318/276 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2014/0320998 A1 | 10/2014 | Calaway et al. |

* cited by examiner

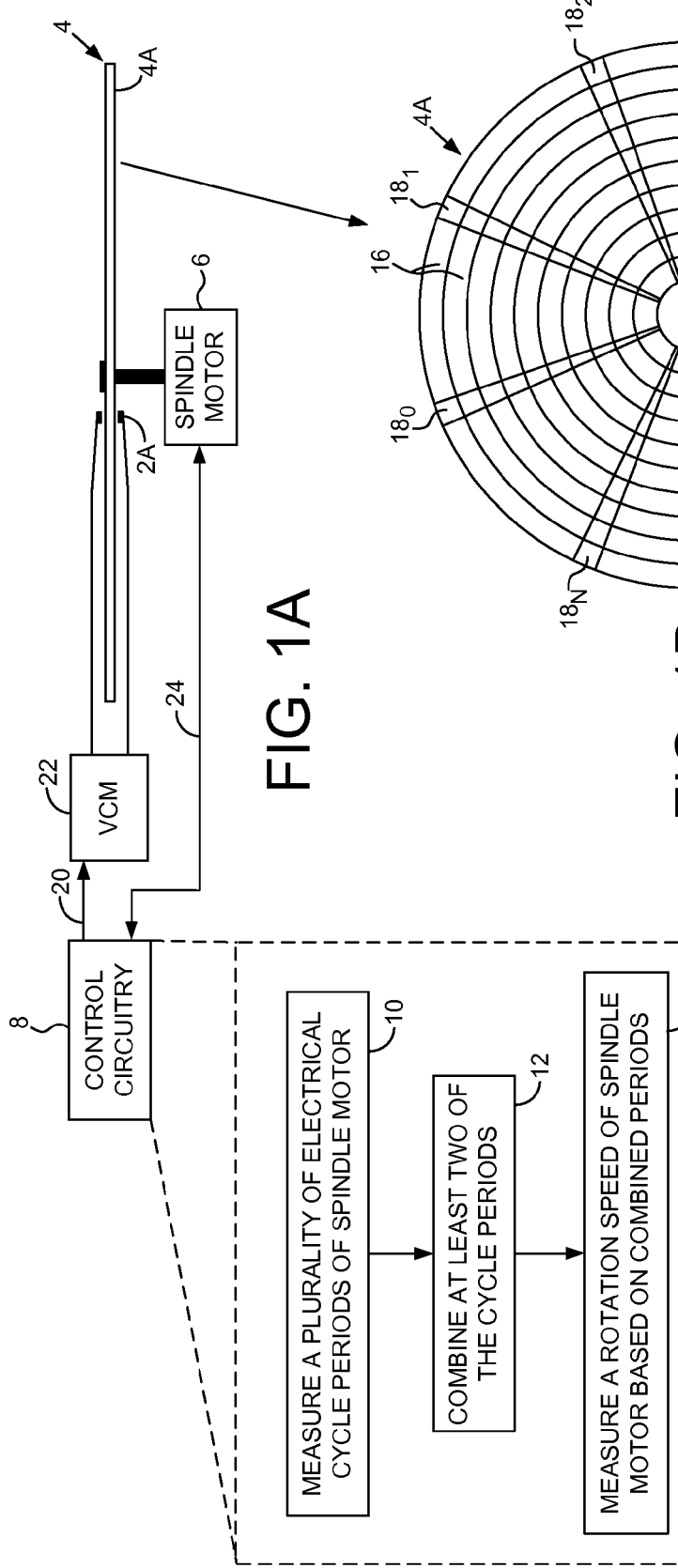
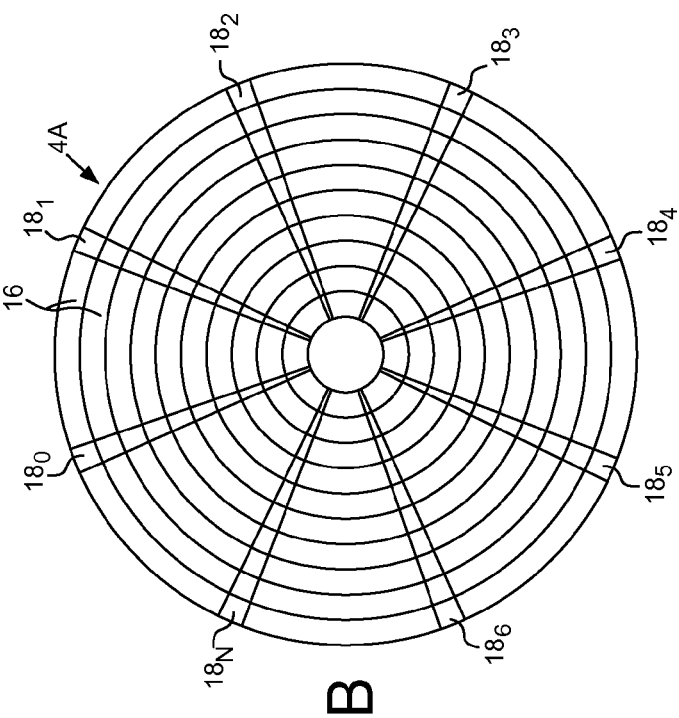
FIG. 1A
FIG. 1B
FIG. 1C

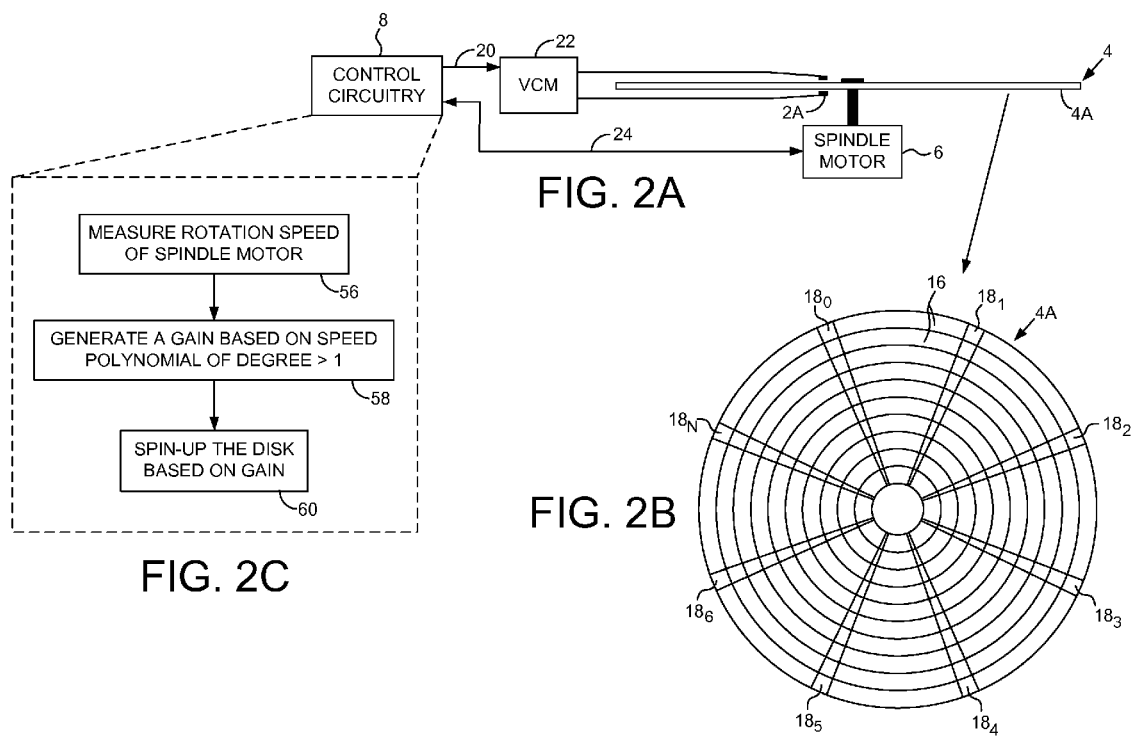

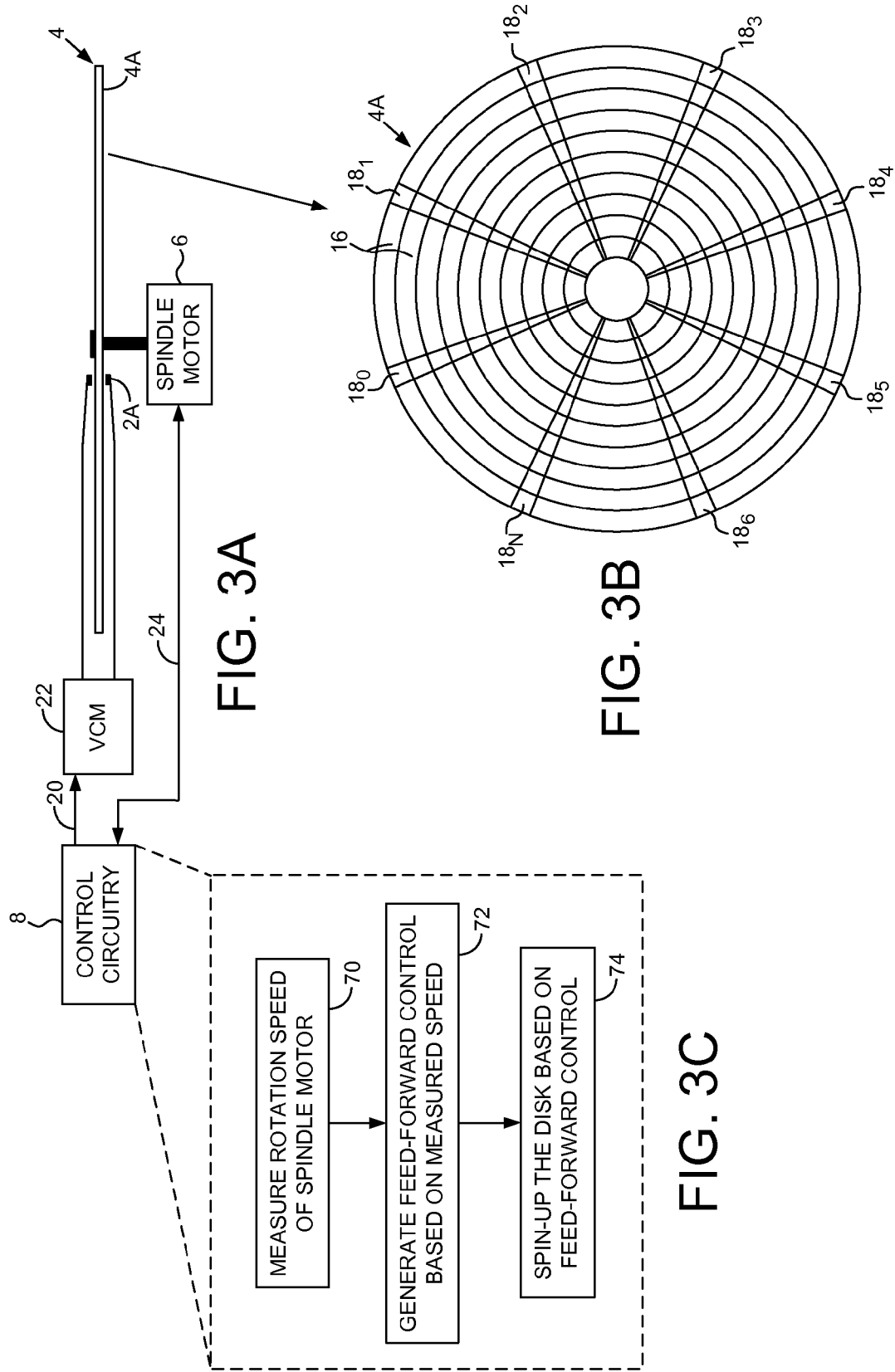

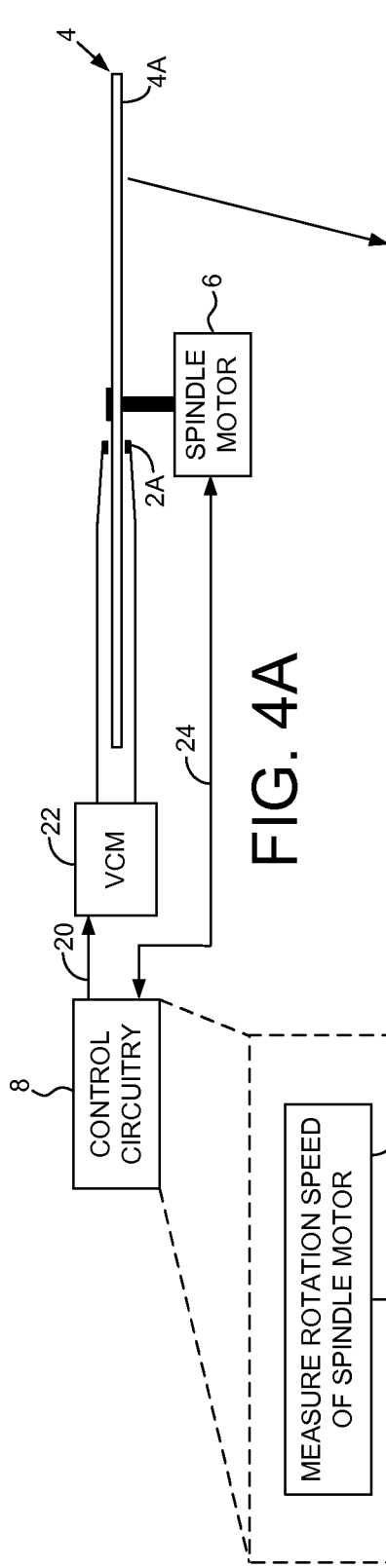
FIG. 4A
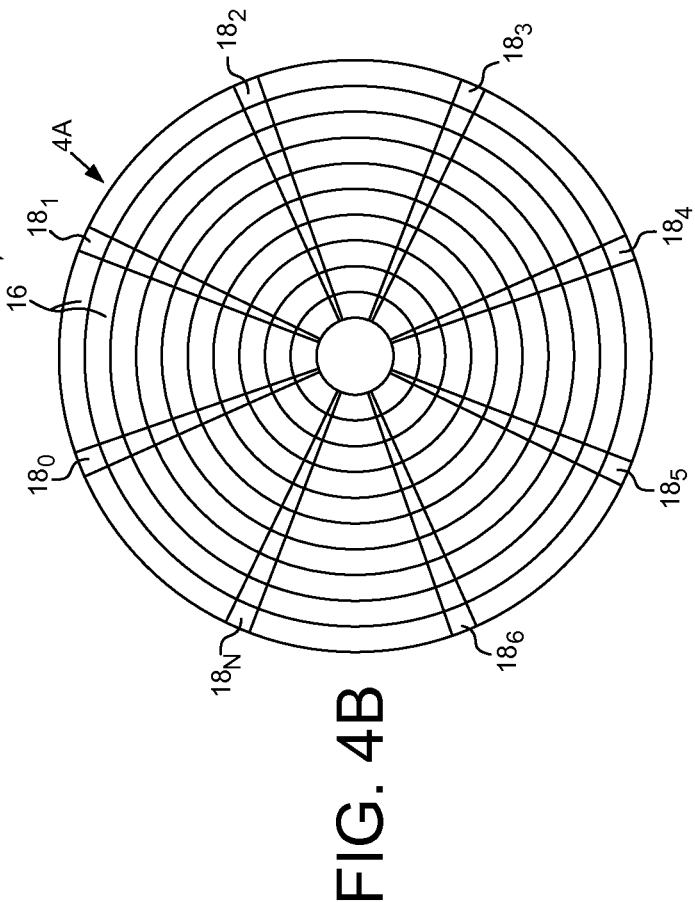
FIG. 4B
FIG. 4C

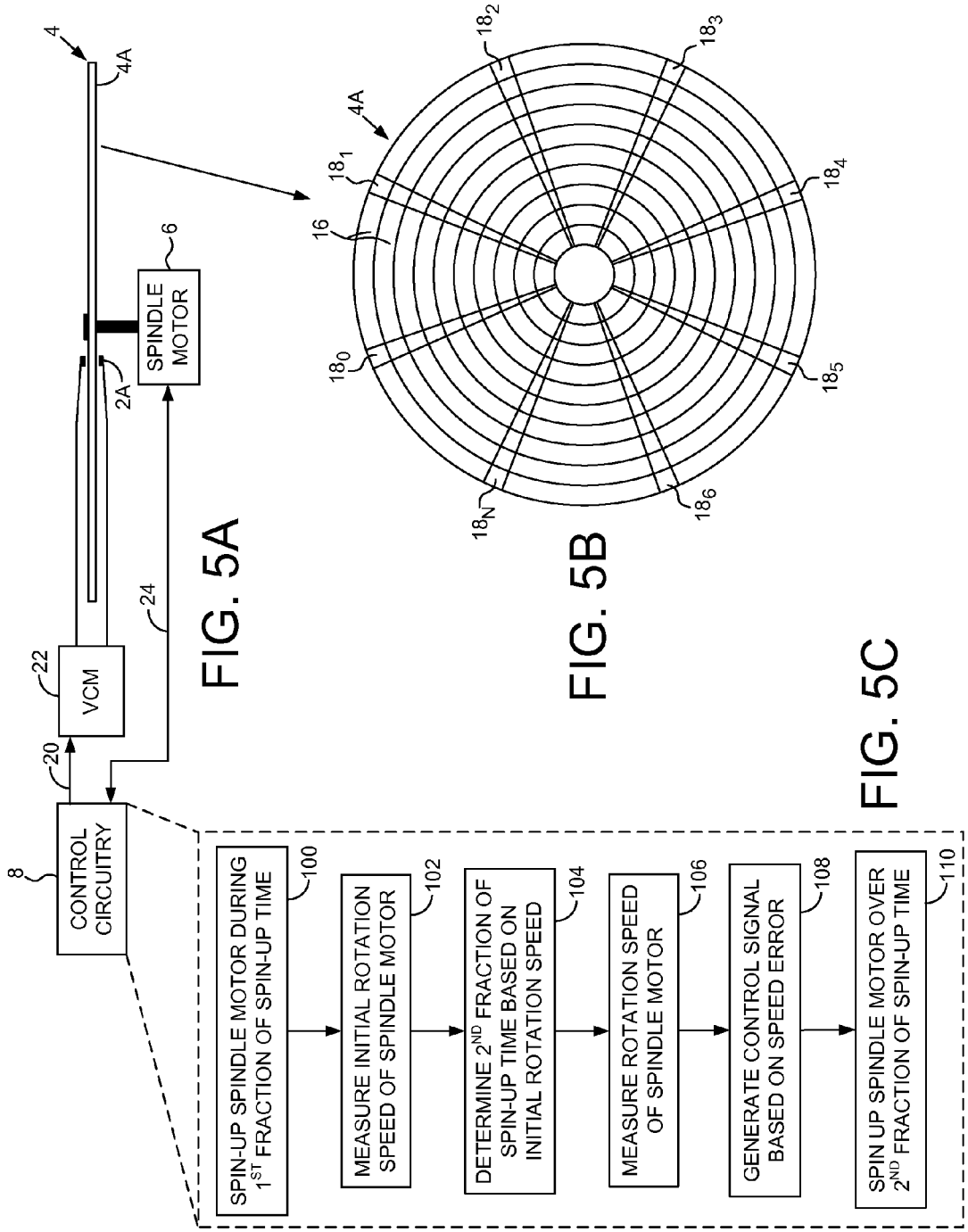

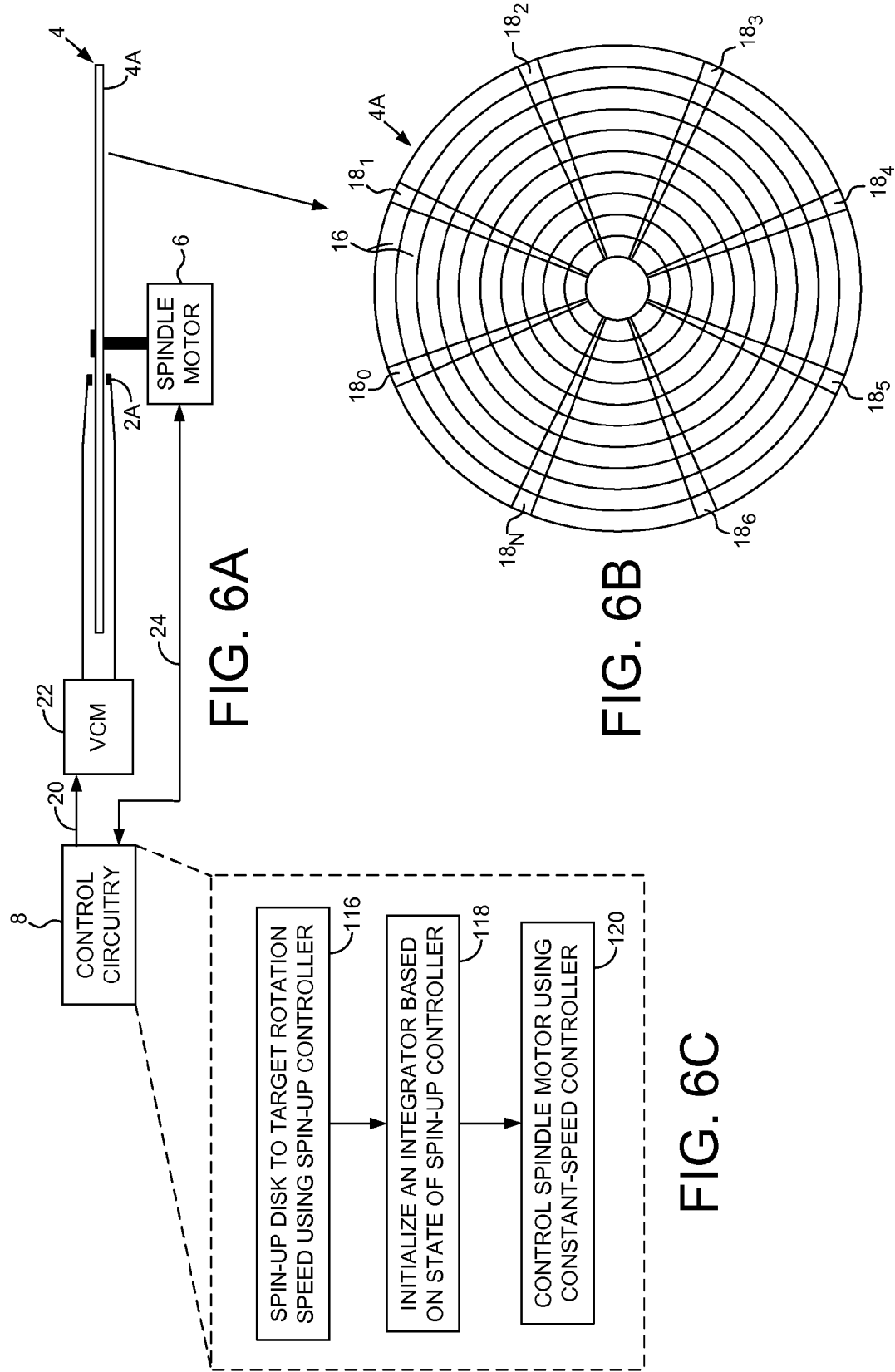

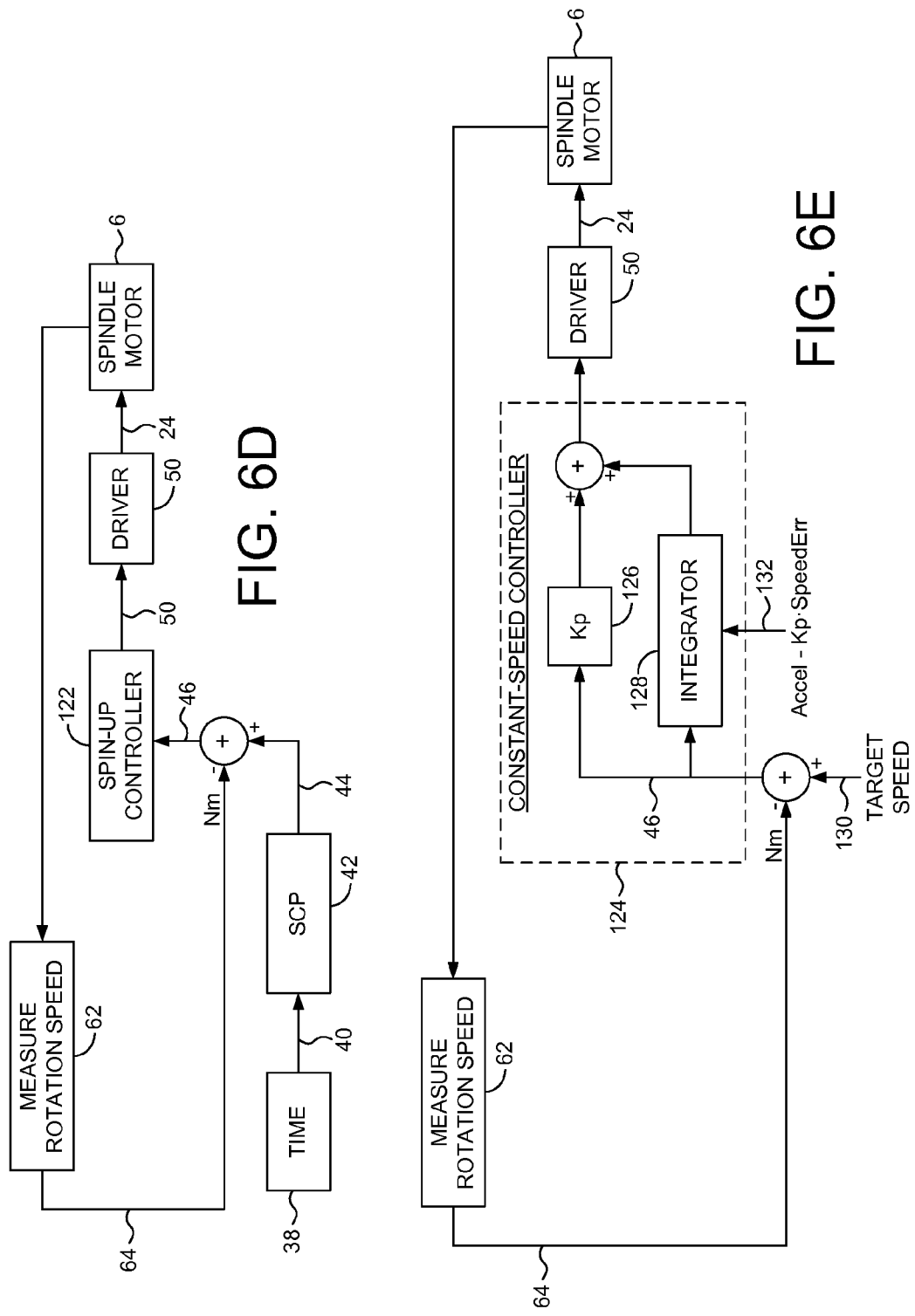

DISK DRIVE WITH IMPROVED SPIN-UP CONTROL

CROSS-REFERENCED TO RELATED APPLICATION(S)

This application is a divisional application of U.S. application Ser. No. 13/869,885, filed Apr. 24, 2013, entitled "DISK DRIVE WITH IMPROVED SPIN-UP CONTROL", the disclosure of which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A spindle motor rotates the disk (or disks) at a high speed so that the head essentially flies over the disk surface on an air bearing. When the disk drive is powered on, a spin-up operation is executed in order to spin up the disk to the operating speed before loading the head over the disk surface. It is desirable to spin up the disk as fast as possible in order to minimize the delay before a host may access the disk drive. In addition, it may be desirable to achieve a substantially consistent spin-up time across a family of disk drives so that a disk drive manufacturer may provide an accurate specification for the spin-up time, thereby enabling the design of storage systems based on the spin-up specification.

BRIEF DESCRIPTION OF THE DRAWINGS

FIGS. 1A and 1B show a disk drive according to an embodiment comprising a head actuated over a disk, and a spindle motor for rotating the disk.

FIG. 1C is a flow diagram according to an embodiment wherein a plurality of electrical cycle periods of the spindle motor are measured, at least two of the cycle periods are combined, and a rotation speed of the spindle motor is measured based on the combined cycle periods.

FIGS. 2A and 2B show a disk drive according to an embodiment comprising a head actuated over a disk, and a spindle motor for rotating the disk.

FIG. 2C is a flow diagram according to an embodiment wherein a spin-up gain is generated as a function of a measured rotation speed of the spindle motor, wherein the function comprises a polynomial having a degree greater than one.

FIGS. 3A and 3B show a disk drive according to an embodiment comprising a head actuated over a disk, and a spindle motor for rotating the disk.

FIG. 3C is a flow diagram according to an embodiment wherein a feed-forward spin-up control is generated based on a measured rotation speed of the spindle motor.

FIGS. 4A and 4B show a disk drive according to an embodiment comprising a head actuated over a disk, and a spindle motor for rotating the disk.

FIG. 4C is a flow diagram according to an embodiment wherein the spindle motor is spun up based on a speed command profile that ensures a minimum spin-up time and a limited power consumption under a worst case environmental condition.

FIGS. 5A and 5B show a disk drive according to an embodiment comprising a head actuated over a disk, and a spindle motor for rotating the disk.

FIG. 5C is a flow diagram according to an embodiment wherein the spindle motor is spun up over a second fraction of a spin-up time based on an initial measured rotation speed of the spindle motor.

FIGS. 6A and 6B show a disk drive according to an embodiment comprising a head actuated over a disk, and a spindle motor for rotating the disk.

FIG. 6C is a flow diagram according to an embodiment wherein after spinning up the spindle motor, an integrator of a constant-speed controller is initialized based on a state of a spin-up controller.

FIG. 6D shows control circuitry for spinning up the spindle motor using a spin-up controller according to an embodiment.

FIG. 6E shows control circuitry for spinning the disk using a constant-speed controller after completing the spin-up operation according to an embodiment.

DETAILED DESCRIPTION

Figure 1D:
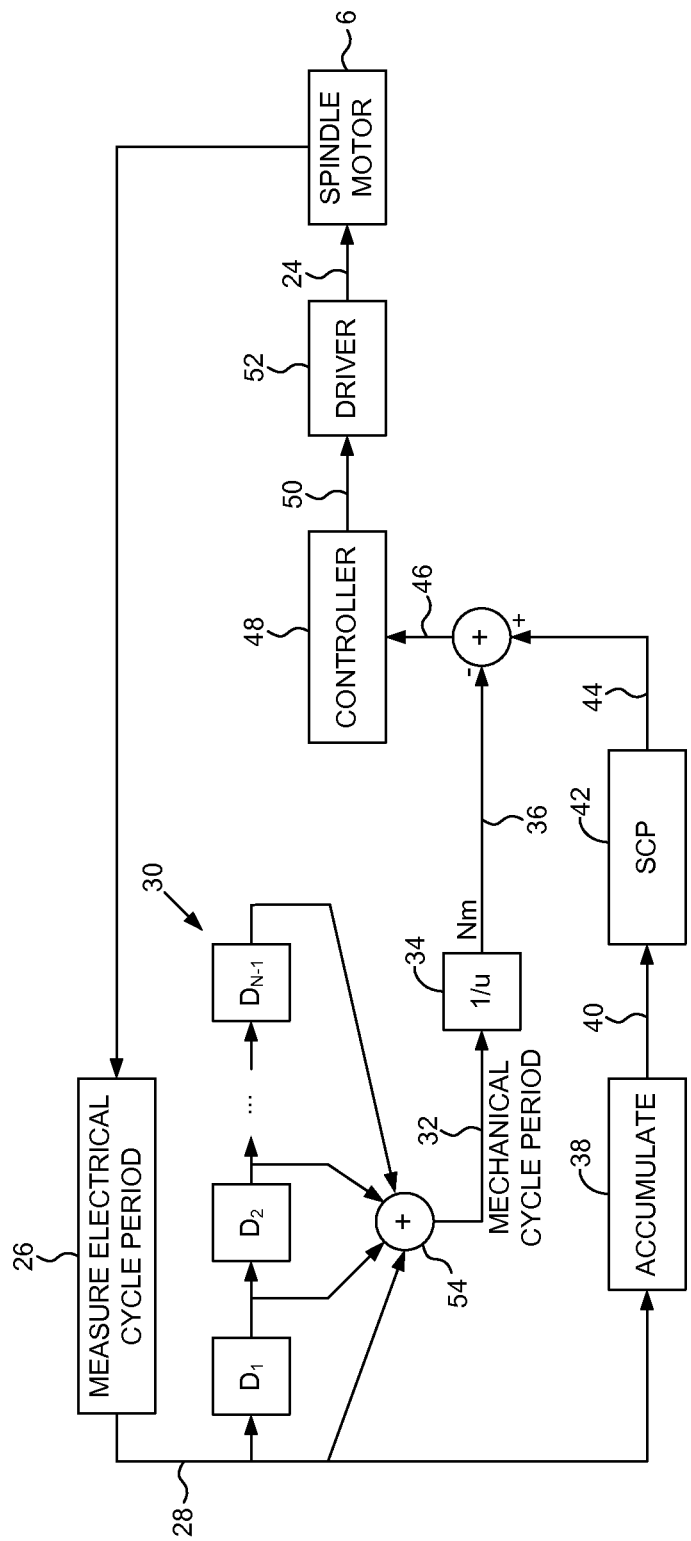
FIG. 1D shows an embodiment wherein the cycle periods are combined using a moving average filter that averages N consecutive electrical cycle periods of the spindle motor.

FIGS. 1A and 1B show a disk drive according to an embodiment comprising a head 2A actuated over a disk 4, and a spindle motor 6 operable to rotate the disk 4. The spindle motor 6 operates according to a plurality of electrical cycles over a single revolution of the spindle motor 6, where each electrical cycle spans a cycle period. The disk drive further comprises control circuitry 8 operable to execute the flow diagram of FIG. 1C, wherein a plurality of the cycle periods are measured (block 10), at least two of the cycle periods are combined (block 12), and a rotation speed of the spindle motor is measured based on the combined cycle periods (block 14).

In the embodiment of FIG. 1B, the disk surface 4A comprises a plurality of servo tracks 16 defined by servo sectors $18_0$-$18_N$, wherein data tracks are defined relative to the servo tracks at the same or different radial density. The control circuitry 8 processes a read signal emanating from the head 2A to demodulate the servo sectors $18_0$-$18_N$ and generate a position error signal (PES) representing an error between the actual position of the head and a target position relative to a target track. The control circuitry 8 filters the PES using a suitable compensation filter to generate a control signal 20 applied to a voice coil motor (VCM) 22 which rotates an actuator arm about a pivot in order to actuate the head 2A radially over the disk surface 4A in a direction that reduces the PES. The servo sectors $18_0$-$18_N$ may comprise any suitable head position information, such as a track address for coarse positioning and servo bursts for fine positioning. The servo bursts may comprise any suitable pattern, such as an amplitude based servo pattern or a phase based servo pattern.

During a spin-up operation, the control circuitry 8 measures a rotation speed of the spindle motor 6 which is compared to a target rotation speed of a speed command profile. A control signal 24 is generated based on the difference (error) so that the rotation speed of the spindle motor substantially follows the speed command profile until reaching the spin-up rotation speed. The performance of the spin-up operation may depend on the accuracy of the measured rotation speed of the spindle motor.

In one embodiment, the rotation speed of the spindle motor may be measured by evaluating the back electromotive force (BEMF) zero-crossings in each winding of the spindle motor. The spindle motor typically operates according to a plurality of electrical cycles over a single revolution, wherein the total number of electrical cycles depends on the number of pole-pairs employed in the spindle motor. For example, a 6-pole-pair spindle motor will generate six electrical cycles over a single revolution. Accordingly, at each BEMF zero crossing representing the end of an electrical cycle, the rotation speed of the spindle motor may be represented as:

$$SpindleSpeed[RPM] = \frac{60}{cycle\_period \cdot [\#of\_pole\_pairs]}$$

However, due to a misalignment of the poles, measuring the rotation speed of the spindle motor based on a single electrical cycle period results in a noisy measurement, thereby reducing the performance of the spin-up operation. Accordingly, in one embodiment the noise due to the misalignment of the poles is attenuated by combining at least two of the cycle periods, and then measuring the rotation speed of the spindle motor based on the combined cycle periods.

FIG. 1D shows control circuitry according to an embodiment wherein the spindle motor operates according to N electrical cycles over a single revolution of the spindle motor, and the cycle periods are combined by summing N consecutive cycle periods. Block 26 measures an electrical cycle period 28 of the spindle motor, such as by detecting a zero crossing in the BEMF voltage generated by the windings. The measured electrical cycle periods 28 are shifted into a delay line 30, and after measuring N electrical cycle periods, a mechanical cycle period 32 is generated as the sum of the last N measured electrical cycle periods 28. The mechanical cycle period 32 is converted at block 34 into a measured rotation speed 36 in rotations per minute (RPM). The measured electrical cycle periods are accumulated 38 to generate a time index 40 used to index a speed command profile (SCP) 42 that outputs a target rotation speed 44 over a spin-up interval. The measured rotation speed 36 is subtracted from the target rotation speed 44 to generate an error signal 46 processed by a controller 48. The controller 48 generates a control signal 50 applied to a driver 52 in order to generate the control signal 24 applied to the spindle motor 6 to thereby accelerate the spindle motor 6 so that the rotation speed substantially follows the target speed output by the SCP 42.

In the embodiment of FIG. 1D, as each new electrical cycle period 28 is measured at block 26, the mechanical cycle period 32 is updated based on the running N consecutive electrical cycle periods. That is, the delay line 30, adder 54, and scalar 34 implement a moving average filter (MAF) of the form:

$$SpindleSpeed[RPM] = \frac{60}{[1 + z^{-1} + z^{-2} \ldots + z^{-(N-1)}] \cdot cycle\_period}$$

The moving average filter represented by the above equation effectively filters out the noise in the measured rotation speed of the spindle motor caused by the misalignment of the poles. In one embodiment, the above moving average filter may be modified to sum fewer or more than the N electrical cycle periods over a revolution of the spindle motor.

FIGS. 2A and 2B show a disk drive according to an embodiment wherein the control circuitry 8 is operable to execute the flow diagram of FIG. 2C during a spin-up operation. A rotation speed of the spindle motor is measured (block 56), and a gain is generated as a function of the measured rotation speed (block 58), wherein the function comprises a polynomial having a degree greater than one. The spindle motor is spun up based on the gain (block 60).

Figure 2D:
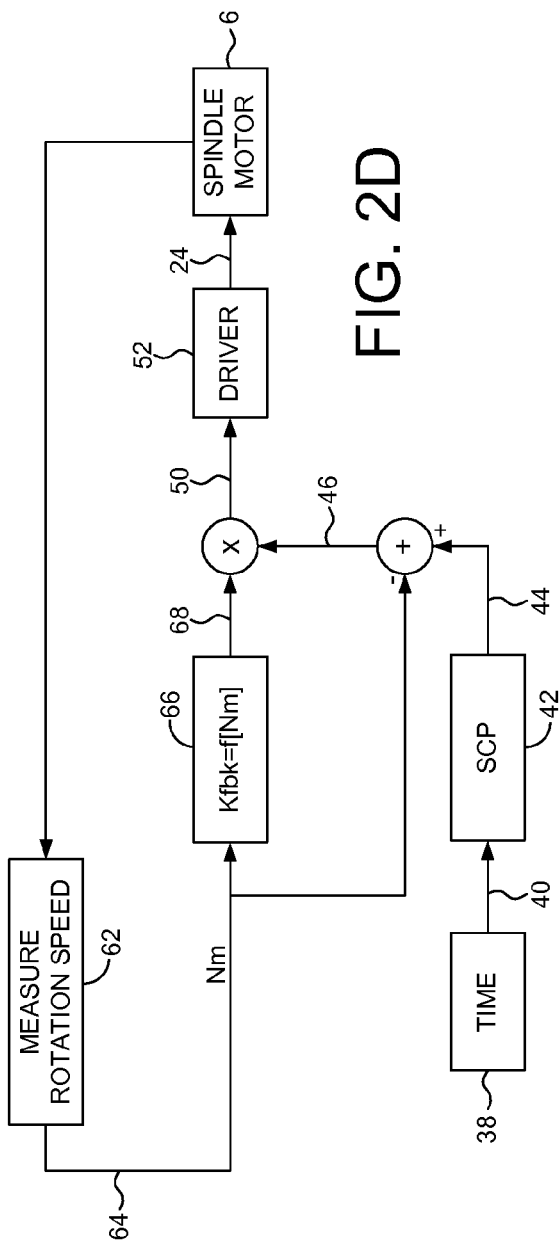
FIG. 2D shows control circuitry for spinning up the spindle motor based on the spin-up gain according to an embodiment.

FIG. 2D shows control circuitry for spinning up the spindle motor according to an embodiment wherein block 62 measures a rotation speed 64 of the spindle motor 6, such as by measuring the electrical cycle periods as described above. A function 66 generates a gain Kfbk 68 that is used to spin up the spindle motor, where in the embodiment of FIG. 2D, the gain Kfbk 68 is multiplied by the error signal 46 to generate the control signal 50. That is, the control circuitry in the embodiment of FIG. 2D comprises at least a proportional controller for spinning up the spindle motor, wherein the gain of the proportional controller is generated as a function of the measured rotation speed of the spindle motor.

Figure 2E:
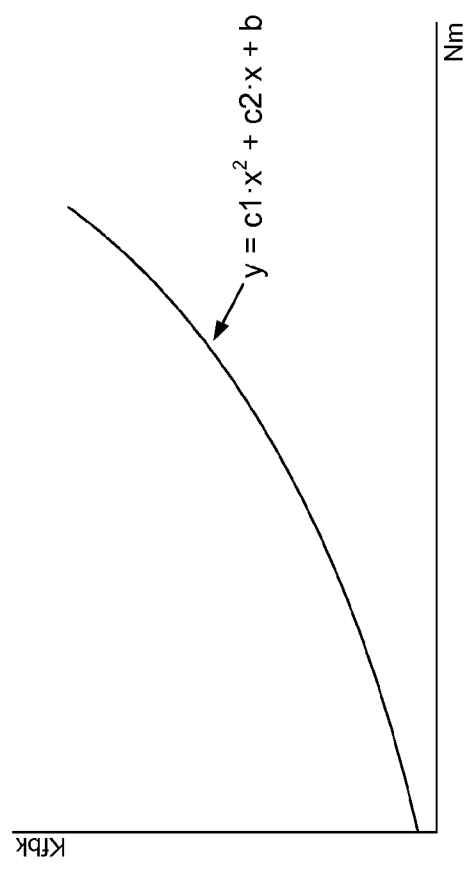
FIG. 2E shows a polynomial of degree greater than one for generating the spin-up gain as a function of the measured rotation speed of the spindle motor according to an embodiment.

FIG. 2E illustrates an embodiment wherein the function 66 for generating the gain Kfbk in FIG. 2D comprises a polynomial having a degree greater than one. In the example of FIG. 2D, the function 66 comprises a quadratic polynomial; however, other embodiments may use a higher degree polynomial. In one embodiment, the gain Kfbk may be computed for a number of different rotation speeds based on a design bandwidth of the control loop using a complex equation, which consists of the transfer functions of the spindle motor 6, motor driver 52, and the function for measuring the rotation speed of the spindle motor (e.g., the MAF described above). After generating the gain Kfbk for the number of different rotation speeds, the gain values may be fitted to a curve representing a polynomial having a degree greater than one. The following is an example derivation of the gain Kfbk based on the measured rotation speed and the bandwidth of the control loop:

Define Units:

RPM :=

$$\frac{2\pi rad}{60s} \quad kRPM := 1000 \text{ RPM} \quad gmf := 10^{-3} \text{ kgf} \quad j := \sqrt{-1}$$

Motor Parameters:

$$\text{Inertia} := 44 \text{ gm} \cdot \text{cm}^2 = 4.4 \times 10^{-6} \text{ m}^2 \cdot \text{kg}$$

$$K_e := 0.61 \frac{V}{\text{kRPM}} \quad K_t := K_e = 5.825 \times 10^{-3} \cdot \frac{N \cdot m}{A}$$

$$K_f := 0.45 \frac{\text{gmf} \cdot \text{cm}}{\text{kRPM}}$$

$$R_w := 3.6\Omega \quad R_i := 0.124\Omega \quad R_d := 0.648 \cdot \Omega$$

$$L_w := 0.6 \text{ mH} \quad R_a := R_w + R_i + R_d = 4.372\Omega$$

$$\text{Speed}_0 := 5400 \text{ RPM} \quad \omega_0 := \text{Speed}_0 = 565.487 \cdot \frac{\text{rad}}{s}$$

$$T_s := \frac{2\pi}{\omega_0} = 0.011s$$

$$\text{Ecycles} := 6 \quad \omega_{e0} := \omega_0 \cdot \text{Ecycles} = 3.393 \times 10^3 \cdot \frac{\text{rad}}{s}$$

$$T_{es} := \frac{2\pi}{\omega_0 \cdot \text{Ecycles}} = 1.852 \cdot \text{ms} \quad \text{SpClockFreq} := 100 \text{ MHz}$$

$$\text{SpClockDiv} := 32 \quad V_{supply} := 5 \text{ V} \quad nBitsKval := 12$$

$$f_{olbw} := \frac{1}{48 T_{es}} = 11.25 \cdot \text{Hz}$$

$$K_d := \frac{1}{1 \text{ RPM}} \cdot \frac{1}{1} \cdot \frac{V}{2^{nBitsKval} - 1} = 0.012 \cdot V \cdot s$$

$$\text{MarginLT} := 0.8 \quad \text{MarginK}_e := 0.9$$

Basic Calculations:

Electric Pole: $\text{Pole}_e := \frac{R_a}{L_w} = 7.287 \times 10^3 \cdot \text{Hz}$ Equivalent Impedance: $R_{eq} := \frac{(\omega_{e0} \cdot L_w)^2 + R_a^2}{R_a} = 5.32\Omega$ Mechaniacal Pole: $\text{Pole}_m := \frac{K_f \cdot R_{eq} + K_e \cdot K_t}{\text{Inertia} \cdot R_{eq}} = 1.545 \cdot \text{Hz}$ Gain $:= \frac{K_t}{K_f \cdot R_{eq} + K_t \cdot K_e} = 161.032 \cdot \frac{A}{m \cdot N}$ Motor Transfer function:

$$G_m(s) := \frac{K_t}{s \cdot \text{Inertia} \cdot R_{eq} + K_f \cdot R_{eq} + K_t \cdot K_e}$$

Moving Average Filter:

$$MAFz(z) := \frac{z^5 + z^4 + z^3 + z^2 + z + 1}{6 \cdot z^5}$$

$$MAFs(s) := MAFz\left(\frac{2 + s \cdot T_{es}}{2 - s \cdot T_{es}}\right)$$

Open Loop Transfer function:

$$G_{open}(s) = G_m(s) \cdot MAFs(s) \cdot \left(K_{fbk} \cdot K_d - K_e \cdot \text{MarginK}_e - \frac{R_a \cdot K_f \cdot \text{MarginLT}}{K_t}\right)$$

PI Controller coefficents:

$$f_{olbw} = 11.25 \cdot \text{Hz} \quad \omega_{olbw} := 2\pi f_{olbw} = 70.686 \cdot \frac{\text{rad}}{s}$$

$$K_{fbk} := \frac{1 + |G_m(j \cdot \omega_{olbw}) \cdot MAFs(j \cdot \omega_{olbw})| \cdot \left(K_e \cdot \text{MarginK}_e + \frac{R_a \cdot K_f \cdot \text{MarginLT}}{K_t}\right)}{|K_d \cdot G_m(j \cdot \omega_{olbw}) \cdot MAFs(j \cdot \omega_{olbw})|} = 25.457$$

In the above example, the gain Kfbk=25.457 has been computed for a measured rotation speed of 5400 RPM. The following table shows the gain Kfbk computed using the above derivation for different measured rotation speeds of the spindle motor. The gain Kfbk values in the table may then be fitted to a curve represented by the following polynomial:

Kfbk=0.797+0.3255·(RPM/100)+0.0024·(RPM/100)$^2$

| Spindle Speed (RPM) | Sample Frequency (Hz) | Open Loop Bandwidth (Hz) | $K_{fbk}$ |
|---|---|---|---|
| 300 | 30 | 0.63 | 1.743 |
| 400 | 40 | 0.83 | 2.081 |
| 500 | 50 | 1.04 | 2.448 |
| 750 | 75 | 1.56 | 3.38 |
| 1000 | 100 | 2.08 | 4.33 |
| 1500 | 150 | 3.13 | 6.304 |
| 1750 | 175 | 3.65 | 7.305 |
| 2000 | 200 | 4.17 | 8.326 |
| 2250 | 225 | 4.69 | 9.368 |
| 2500 | 250 | 5.21 | 10.435 |
| 3000 | 300 | 6.25 | 12.651 |
| 3500 | 350 | 7.29 | 14.995 |
| 4500 | 450 | 9.38 | 20.173 |
| 5400 | 540 | 11.25 | 25.457 |

FIGS. 3A and 3B show a disk drive according to an embodiment wherein the control circuitry 8 is operable to execute the flow diagram of FIG. 3C during a spin-up operation. A rotation speed of the spindle motor is measured (block 70), and feed-forward control is generated based on the measured rotation speed (block 72). The spindle motor is spun up based on the feed-forward control (block 74).

Figure 3D:
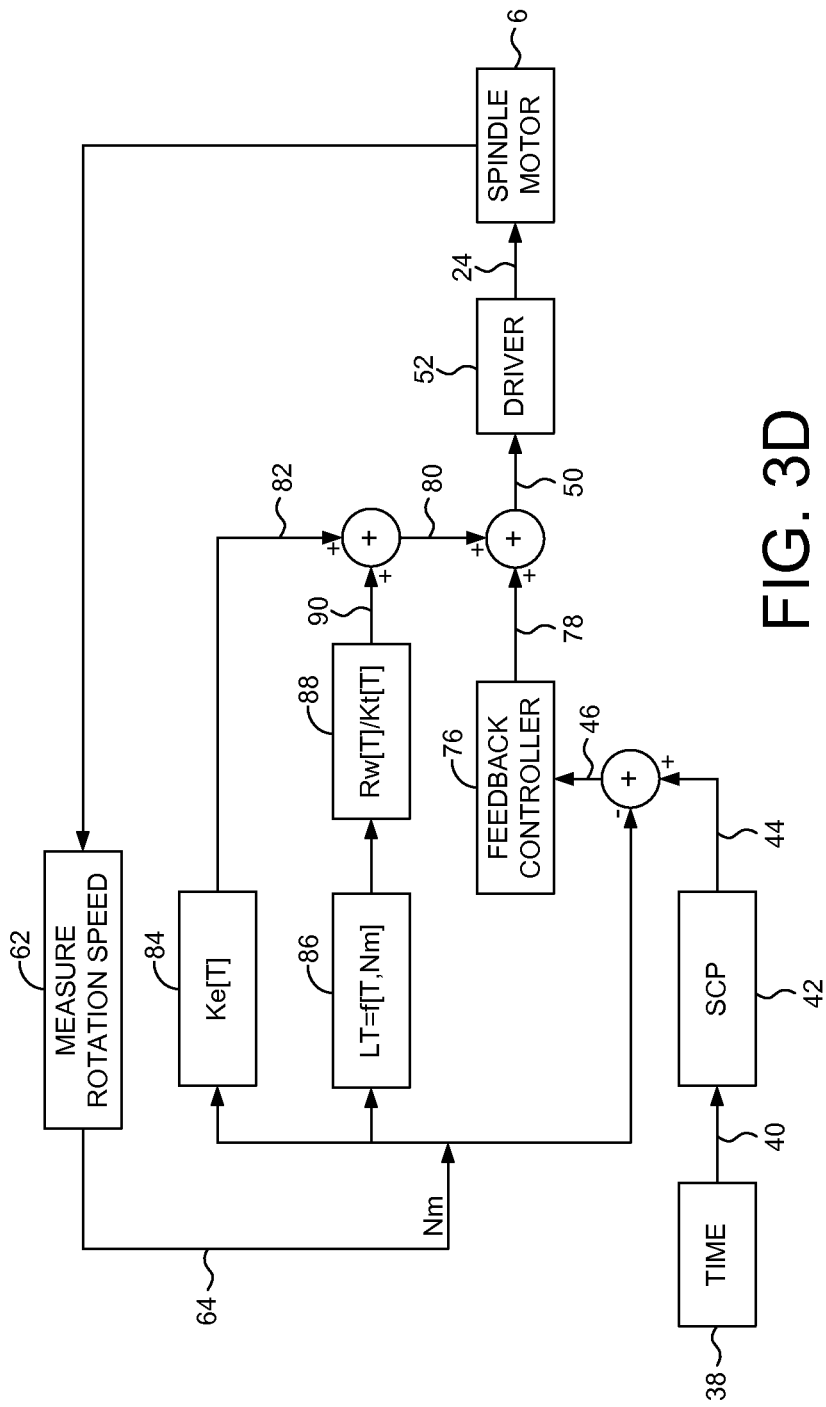
FIG. 3D shows control circuitry for spinning up the spindle motor based on the feed-forward spin-up control according to an embodiment.

FIG. 3D shows control circuitry for spinning up the spindle motor according to an embodiment wherein a feedback controller 76 generates a feedback control signal 78 based on the error signal 46. The feedback controller 76 may implement any suitable feedback algorithm, such as the proportional control shown in FIG. 2D. The feedback control signal 78 is adjusted by a feed-forward control signal 80 to generate the control signal 50 applied to the driver 52. The feed-forward control signal 80 may compensate for one or more disturbances injected into the control loop, such as a BEMF of the spindle motor 6, or a drag torque of the spindle motor 6.

In one embodiment, the BEMF of the spindle motor 6 counteracts the acceleration torque of the control signal 50, thereby requiring a higher control signal (e.g., a higher driving current) in order to apply the desired acceleration torque to the spindle motor 6. In one embodiment, the BEMF of the spindle motor 6 increases proportionally with the rotation speed Nm of the spindle motor, and therefore in the embodiment shown in FIG. 3D, a first feed-forward control signal 82 is generated by multiplying the measured rotation speed 64 by a gain Ke 84 representing the BEMF constant of the spindle motor 6. In one embodiment, the BEMF constant of the spindle motor varies based on the ambient temperature, and therefore in the embodiment of FIG. 2D the gain Ke 84 is adjusted based on a measured ambient temperature T of the disk drive.

In one embodiment, the spindle motor 6 may exhibit a counteracting drag torque that may also vary based on the rotation speed of the spindle motor 6 according to:

$$(LT = f[T, Nm]) \cdot \frac{Rw[T]}{Kt[T]}$$

where LT represents the load torque which is a function of the rotation speed Nm and ambient temperature T, Rw represents a winding resistance which is a function of ambient temperature T, and Kt represents a torque constant of the spindle motor which is a function of ambient temperature T. Accordingly, the control circuitry of FIG. 3D comprises blocks 86 and 88 representing the above equation to generate a second feed-forward control signal 90 added to the first feed-forward control signal 82 to generate a composite feed-forward control signal 80. Any suitable function may be employed to compute the load torque (LT) as a function of the rotation speed Nm and the ambient temperature T, wherein in one embodiment the function may be generated by curve fitting nominal load torque measurements over a number of different ambient temperatures taken for a representative subset of spindle motors.

FIGS. 4A and 4B show a disk drive according to an embodiment wherein the control circuitry 8 is operable to execute the flow diagram of FIG. 4C during a spin-up operation. A rotation speed of the spindle motor is measured (block 92), and a control signal is generated based on the measured rotation speed and a speed command profile (block 94). The spindle motor is spun up based on the control signal (block 96).

Figure 4D:
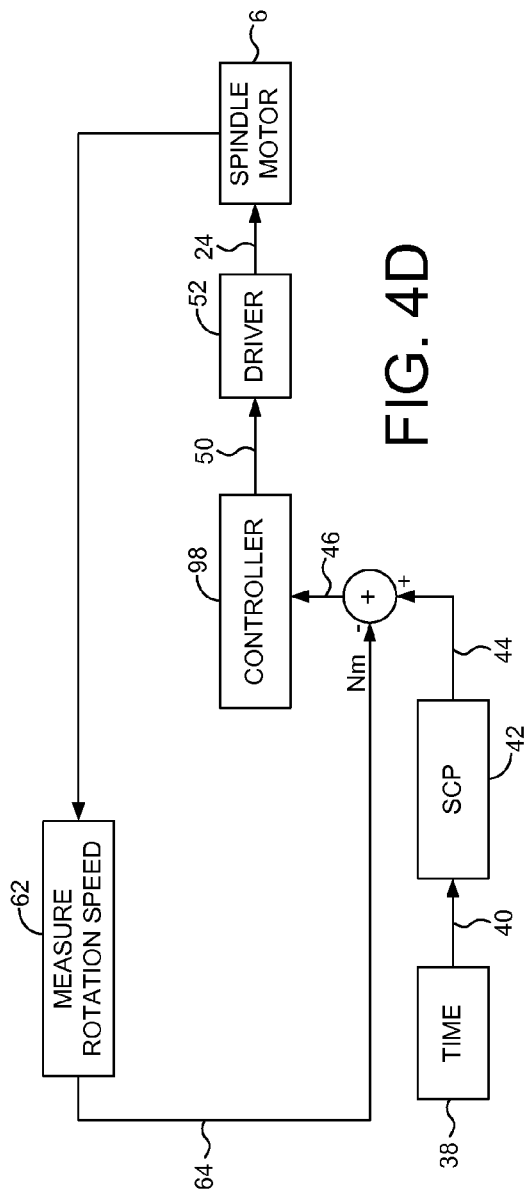
FIG. 4D shows control circuitry for spinning up the spindle motor based on the speed command profile according to an embodiment.
Figure 4E:
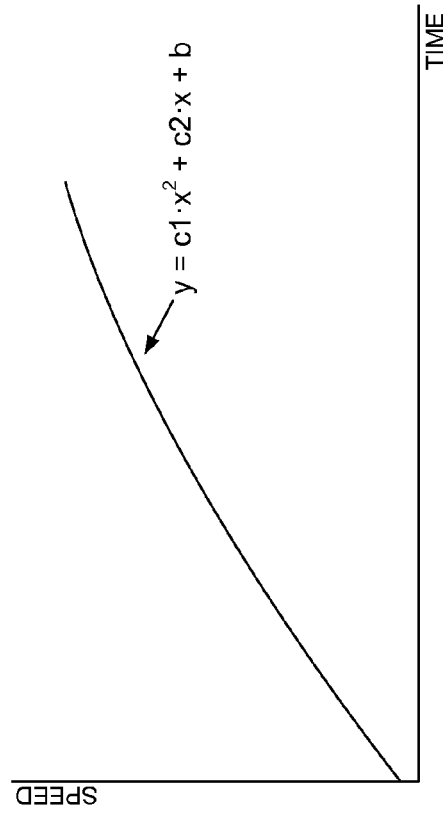
FIG. 4E shows an example speed command profile according to an embodiment.

FIG. 4D shows control circuitry for spinning up the spindle motor according to an embodiment wherein the speed command profile 42 is generated to ensure a minimum spin-up time and a limited power consumption under a worst case environmental condition. A controller 98 generates the control signal 50 based on a difference (error signal 46) between the measured rotation speed 64 of the spindle motor and a target rotation speed generated by the speed command profile 42. FIG. 4E shows an example of a speed command profile 42 comprising a target speed as a function of the spin-up time. The speed command profile may be generated in any suitable manner, such as by empirically evaluating a representative subset of spindle motors over worst case environmental conditions, such as worst case ambient temperature. In another embodiment, the speed command profile may be computed theoretically based on nominal technical characteristics of the spindle motor, as well as a nominal characterization of the spindle motor under worst case environmental conditions. In one embodiment, the speed command profile may account for a maximum current draw of the spindle motor. By taking into account the worst case environmental conditions, together with the maximum current draw of the spindle motor, the speed command profile 42 may be generated that will ensure a minimum (as well as consistent) spin-up time and a limited power consumption across all operating conditions.

FIGS. 5A and 5B show a disk drive according to an embodiment wherein the control circuitry 8 is operable to execute the flow diagram of FIG. 5C during a spin-up operation. A rotation speed of the spindle motor is measured (block 106), and a control signal is generated based on a difference between the measured rotation speed and a target rotation speed (block 108). The spindle motor is spun-up based on the control signal generated over a second fraction of a spin-up time (block 110), wherein the target rotation speed is generated based on a speed command profile and the second fraction of the spin-up time. The second fraction of the spin-up time is determined based on an initial measured rotation speed of the spindle motor (block 104) prior to generating the control signal.

Figure 5D:
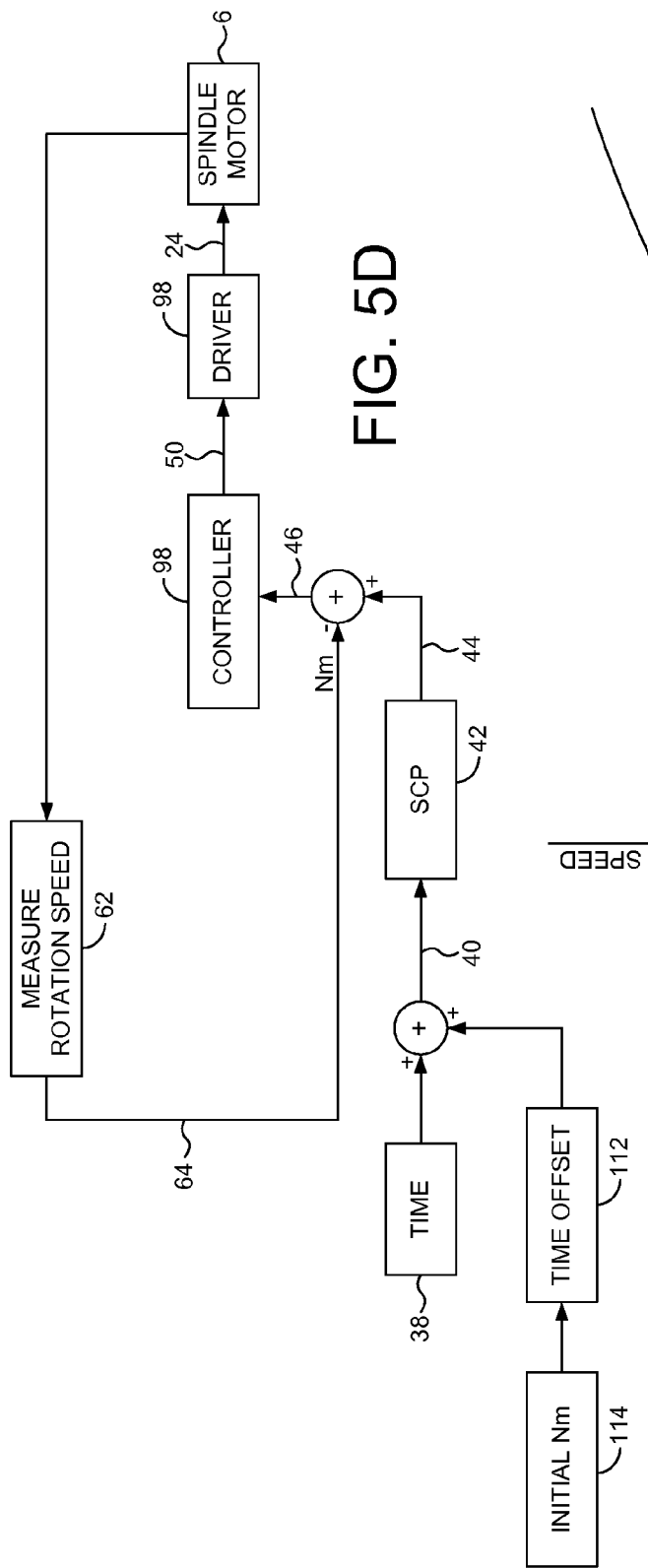
FIG. 5D shows control circuitry for spinning up the spindle motor over the second fraction of a spin-up time according to an embodiment.

In the embodiment of FIG. 5C, the control circuitry 8 begins spinning up the spindle motor during a first fraction of the spin-up time using an open loop control system (block 100). After the first fraction of the spin-up time, the initial rotation speed of the spindle motor is measured (block 102) so that the second fraction of the spin-up time may be determined (block 104). In one embodiment illustrated by the speed command profile shown in FIG. 5E, the spindle motor is spun-up over a spin-up time with a corresponding target speed increasing over time. During the first fraction of the spin-up time, the spindle motor is controlled open loop (independent of the control signal 50), wherein at the end of this time the spindle motor will be rotating at an unknown rotation speed. Before enabling the closed loop control circuitry of FIG. 5D, the initial rotation speed of the spindle motor is measured so that a corresponding point on the speed command profile of FIG. 5E may be determined, and so that the time index 40 may be appropriately initialized.

Figure 5E:
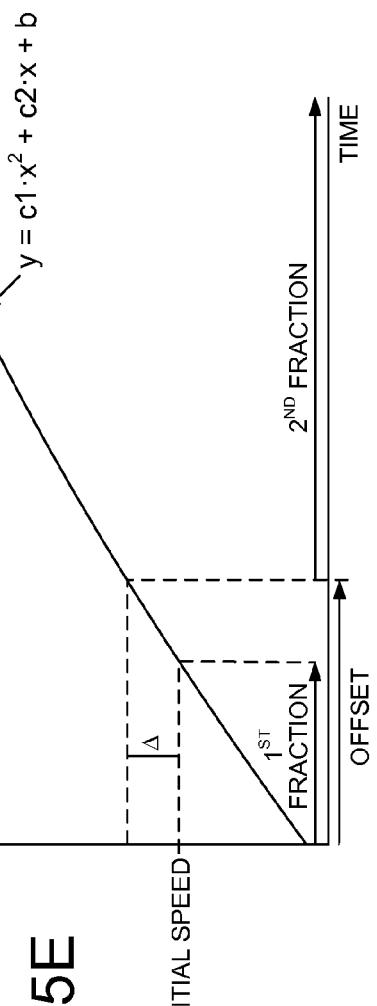
FIG. 5E shows how the second fraction of the spin-up time may be determined based on an initial measured rotation speed of the spindle motor according to an embodiment.

In the embodiment illustrated in FIG. 5E, a delta is added to the initial measured rotation speed so that an initial target rotation speed when enabling the closed loop control circuitry of FIG. 5D is higher than the initial measured rotation speed. In this manner, the initial target rotation speed ensures the spindle motor continues accelerating from the initial measured rotation speed after enabling the control circuitry of FIG. 5D. After adding the delta to generate the initial target rotation speed, the corresponding time in the speed command profile may be determined. The time 38 in FIG. 5D may be initialized to zero, and an offset 112 added to the time 38 that is based on the initial measured rotation speed 114 of the spindle motor. Referring again to FIG. 5E, after adding the offset 112 to the time 38, the speed command profile then generates the target rotation speed over the second fraction of the spin-up time, wherein the control signal 50 in the closed loop control circuitry of FIG. 5D is generated based on this target rotation speed.

FIGS. 6A and 6B show a disk drive according to an embodiment wherein the control circuitry 8 is operable to execute the flow diagram of FIG. 6C during a spin-up operation. The spindle motor is spun up to a target rotation speed using a spin-up controller (block 116). After spinning up the spindle motor, an integrator is initialized based on a state of the spin-up controller (block 118), and the spindle motor is then controlled using a constant-speed controller comprising the integrator (block 120).

FIG. 6D shows control circuitry comprising a spin-up controller 122 operable to spin up the spindle motor 6 using, for example, one or more of the above described techniques. FIG. 6E shows control circuitry according to an embodiment wherein at the end of the spin-up operation, a constant-speed controller 124 is used to control the speed of the spindle motor 6. In the embodiment of FIG. 6E, the constant-speed controller 124 comprises a proportional/integral (PI) controller including a proportional gain Kp 126 for multiplying the error signal 46 and an integrator 128 for integrating the error signal 46. The error signal 46 may be generated as the difference between the measured rotation speed 64 of the spindle motor 6 and a target speed 130 corresponding to a constant rotation speed during normal operation of the disk drive.

In one embodiment, when the control circuitry 8 transitions from the spin-up controller 122 shown in FIG. 6D to the constant-speed controller 124 shown in FIG. 6E, the integrator 128 of the constant-speed controller 124 is initialized based on a state of the spin-up controller 122 in order to minimize any undershoot or overshoot. In one embodiment, the control circuitry 8 will transition from the spin-up controller 122 to the constant-speed controller 124 when the end of the speed command profile is reached at the final target speed (at the end of the spin-up interval), and the error signal 46 is changing at a slow rate which ensures the spin-up controller 122 has reached a steady state. Accordingly, when the spin-up controller 122 has reaches the steady state, the acceleration control signal 50 being generated by the spin-up controller 122 becomes a good candidate for the initial state of the integrator 128 in the constant-speed controller 124. In one embodiment, the control circuitry is operable to initialize the integrator 128 according to:

$$\text{Accel} - Kp \cdot \text{SpeedErr}$$

where Accel represents the acceleration control signal 50 of the spin-up controller 122 at the end of the spin-up operation, Kp represents the gain 126 of the constant-speed controller 124, and SpeedErr represents the error signal 46.

Figure 7:
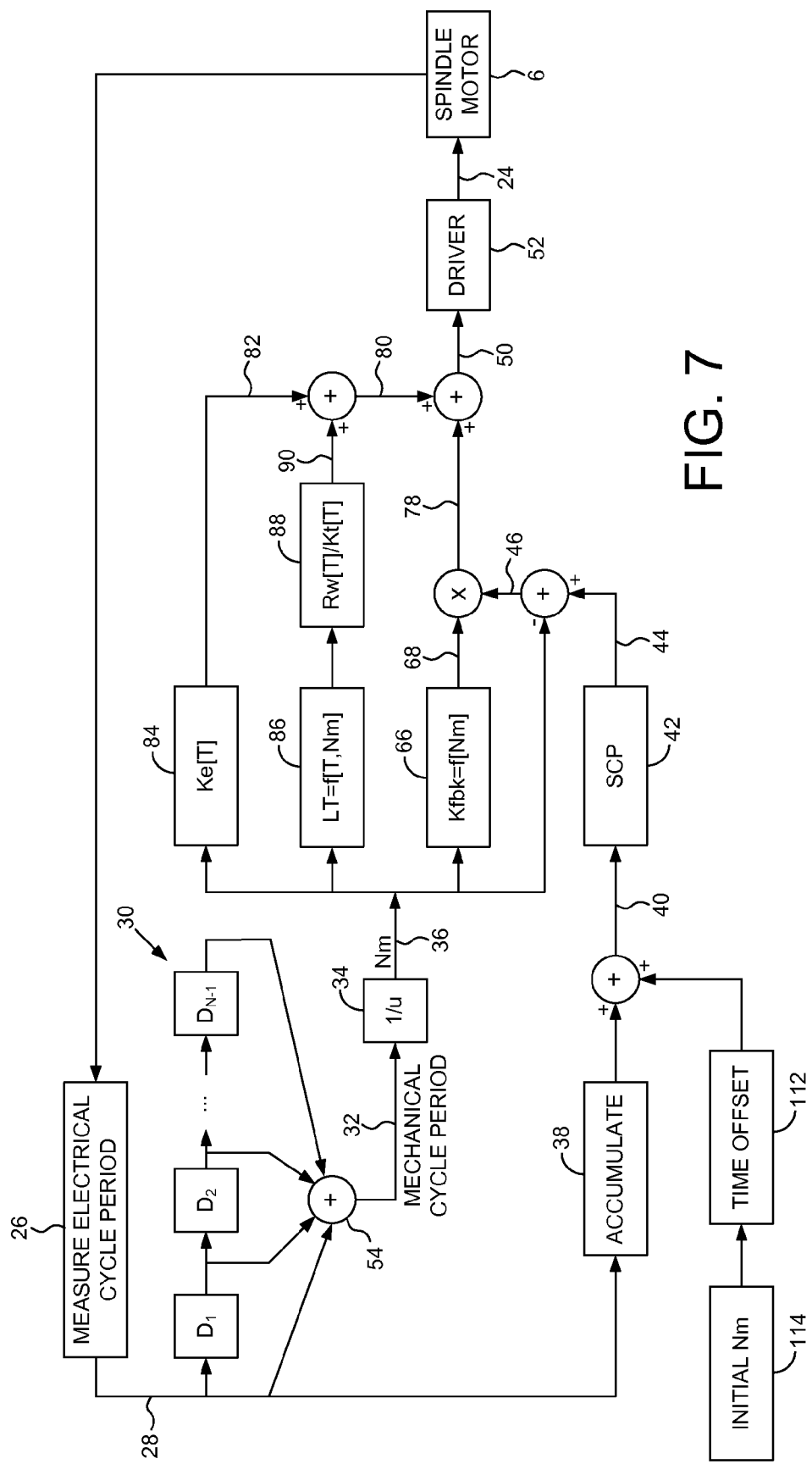
FIG. 7 shows control circuitry for spinning up the spindle motor using a combination of the above-described techniques according to an embodiment.

FIG. 7 shows control circuitry according to an embodiment operable to spin up the spindle motor 6 using a combination of the above-described techniques. However, other embodiments may employ fewer of the above described techniques, or a different technique in combination with one or more of the above-described techniques. For example, in some embodiments it may be unnecessary to employ a moving average filter in order to measure the rotation speed 36 of the spindle motor 6 if there is an insignificant misalignment of the poles. Other embodiments may employ a moving average filter in order to measure the rotation speed 36 with or without employing one or more of the other techniques described above.

Any suitable control circuitry may be employed to implement the flow diagrams in the above embodiments, such as any suitable integrated circuit or circuits. For example, the control circuitry may be implemented within a power integrated circuit (PIC), or in a component separate from the PIC, such as a disk controller, or certain operations described above may be performed by a PIC and others by a disk controller. In one embodiment, the PIC and disk controller are implemented as separate integrated circuits, and in an alternative embodiment they are fabricated into a single integrated circuit or system on a chip (SOC).

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a head actuated over a disk;
   a spindle motor operable to rotate the disk; and
   control circuitry operable to:
      measure a rotation speed of the spindle motor;
      generate a gain as a function of the measured rotation speed, wherein the function comprises a polynomial having a degree greater than one; and
      spin-up the spindle motor based on the gain.

2. The disk drive as recited in claim 1, wherein the gain comprises a feedback gain operable to amplify a feedback error signal based on a difference between the measured rotation speed and a target rotation speed.

3. The disk drive as recited in claim 1, wherein the polynomial consists of a degree of two.

4. A method of operating a disk drive comprising a head actuated over a disk, and a spindle motor operable to rotate the disk, the method comprising:
   measuring a rotation speed of the spindle motor;
   generating a gain as a function of the measured rotation speed, wherein the function comprises a polynomial having a degree greater than one; and
   spinning up the spindle motor based on the gain.

5. The method as recited in claim 4, wherein the gain comprises a feedback gain operable to amplify a feedback error signal based on a difference between the measured rotation speed and a target rotation speed.

6. The method as recited in claim 4, wherein the polynomial consists of a degree of two.

7. Control circuitry for use in a disk drive comprising a head actuated over a disk, and a spindle motor operable to rotate the disk, wherein the control circuitry is operable to:
   measure a rotation speed of the spindle motor;
   generate a gain as a function of the measured rotation speed, wherein the function comprises a polynomial having a degree greater than one; and
   spin-up the spindle motor based on the gain.

8. The control circuitry as recited in claim 7, wherein the gain comprises a feedback gain operable to amplify a feedback error signal based on a difference between the measured rotation speed and a target rotation speed.

9. The control circuitry as recited in claim 8, wherein the polynomial consists of a degree of two.

\* \* \* \* \*